June 11, 1957 B. N. FISHER ET AL 2,795,693

LONG-LINE TUNER WITH VARIABLE END-LOADING FOR SUPERHETERODYNE RECEIVER

Filed March 2, 1953 3 Sheets-Sheet 1

INVENTORS.
BERNE N. FISHER
JOHN CHESNEY
BY
James and Franklin
ATTORNEYS

INVENTORS.
BERNE N. FISHER
JOHN CHESNEY
BY
James and Franklin
ATTORNEYS

INVENTORS.
BERNE N. FISHER
JOHN CHESNEY
BY James and Franklin
ATTORNEYS 2,795,693
Patented June 11, 1957

2,795,693

LONG-LINE TUNER WITH VARIABLE END-LOADING FOR SUPERHETERODYNE RECEIVER

Berne N. Fisher, Roselle, and John Chesney, Roselle Park, N. J., assignors to General Instrument Corporation, Elizabeth, N. J., a corporation of New Jersey Application March 2, 1953, Serial No. 339,724

14 Claims. (Cl. 250—20)

The present invention relates to a tuning unit adapted for use at high frequencies, such as those involved in the recently allocated television channels 14 through 83. The tunning unit is capable of use in and of itself as the primary tuning instrumentality of a television set or the like for the channels in question, and is also particularly adapted to be used in conjunction with existing television sets, already capable of receiving the standard channels 1 through 13, and converting such sets so that they may receive the newly allocated and higher frequency channels.

The allocation of new channels 14–83 for television transmission in the band between 470 and 800 megacycles per second has posed numerous problems to the television industry. The type of tuning unit used with the previously allocated channels 1–13, transmitting on appreciably lower frequencies, are not capable of use with the new higher frequencies. While reception at these higher frequencies is not novel, known receiving instrumentalities capable of functioning in the range in question have been large, cumbersome and in general incapable of mass production and use at a cost which is commercially feasible for the public.

A probably temporary factor compounding the difficulties, but nevertheless a quite significant factor, is the absence from the commercial market of tubes and other circuit components capable of operation at the frequencies involved. This forces the designer to expedients to permit the use of presently existing tubes and components. To design a tuning unit useable only with pre-existing tubes and components would not be wise, since it would become obsolete as soon as new tubes and components become available in sufficient quantity. It is, however, a difficult task to devise a tuning unit operable at the new range of high frequencies in conjunction with the presently existing tubes and components and also useable without substantial modification with the new tubes and components as they become available.

The range of frequencies over which the unit must be tuned, from 470 to 890 megacycles per second, poses a real problem. A range of almost 2:1 is needed. To design a single tuning unit capable of operation over this entire band is no mean task. To devise such a tuning unit which has uniform characteristics from one end of the band to the other is an even more substantial achievement.

The tuning unit of the present invention is a simple, inexpensive and readily constructed instrument, capable of mass production at a low cost. It is characterized by dependability of performance because of its precise engineering and its structural substantiality. The basic unit may be used either with presently existing tubes and components, as here specifically illustrated, or, after slight and insignificant modification as to certain details, with new ultra high frequency tubes and components. The single unit will tune over the entire band of 470 to 890 megacycles per second, and will exhibit substantially uniform operating characteristics throughout that range.

The tuning unit of the present invention is further characterized by the fact that it may function with only one tube, the oscillator tube, even though multi-stage operation is practised. The radio frequency and other stages function without direct amplification, gain being added if needed by a separate amplifying stage after the tuner has performed its detecting function.

In order for this scheme to be effective, so called "insertion loss" must be kept at an absolute minimum and, if the performing characteristics of the unit are to remain the same from one end of the band to the other, must be kept uniform over the entire band. According to the present invention this is accomplished by utilizing variably tuned concentric lines of novel construction, the conductive portions of those lines preferably being silver-plated to increase their conductivity and thus decrease the insertion loss. Tuning is accomplished by utilizing multiple conductive elements in the form of rotary plates similar to those used as rotor plates in conventional rotary variable condensers, those plates as they are rotated overlapping the free ends of the inner conductors of the coaxial lines to varying degrees, thus changing the tuned status of those lines. By appropriately shaping the plates, a straight line or any other desired tuning characteristic may be achieved in a simple and well-understood manner. Moreover, the plates which tune the coaxial lines defining the detecting and mixing stages may be moved simultaneously with, and are preferably mounted on the same shaft as, the elements which tune the oscillator circuit. In this way proper tracking is achieved in a manner which lends itself to mass production and dependability of performance.

The construction employed, in which the outer conductors of the several coaxial lines are defined by horizontal and vertical conductive walls subdividing the tuning unit into a plurality of adjacent compartments, facilitates coupling between adjacent stages and between individual stages and external circuits.

Of special importance is the manner in which an external output circuit is coupled to an appropriate stage of the unit. Constant output amplitude over the entire tuning range is a prime desideratum, but since the voltage and current distribution along a coaxial line of fixed physical length will vary with the frequency to which that line is tuned, constant voltage output from a fixed tap is not ordinarily achievable. However, in the instant tuning device a coil is interposed between a fixed output tap and the external output circuit, the inductance of the coil being so chosen in relation to the point on the coaxial line at which the fixed tap is positioned that constant voltage output is in fact achieved. As the frequencies at which the line is tuned is varied the voltage at the tap point will vary, but the reactance of the coil will also vary, in the same sense and to substantially the same amount. Consequently as the voltage at the tap point increases the voltage drop across the coil will also increase, the output voltage thus remaining substantially steady.

In order to provide for coupling between adjacent stages, the stages being defined by concentric lines, simple wire lops are employed which extend within adjacent lines between the conductors of those lines and which pass through the walls of the lines to be coupled, one end of the loop being electrically connected to said walls and the other end of the loop being conductively separated therefrom. The same type of loop may be employed to couple a given line to an external circuit except that one end of the loop is conductively connected to the external circuit rather than being inductively coupled thereto. When a two-wire external circuit is to be coupled to a given line, a pair of connecting wires may be employed which form symmetrically arranged loops in the appropriate line, thus providing for a balanced input. By choice of the size and length of the connecting wire, variation in loading can be achieved in a simple and effective manner.

To the accomplishment of the above, and to such other objects as may hereinafter appear, the present invention relates to the structure of a tuning unit as defined in the appended claims and as described in this specification, taken together with the accompanying drawings in which:

Figure 1:
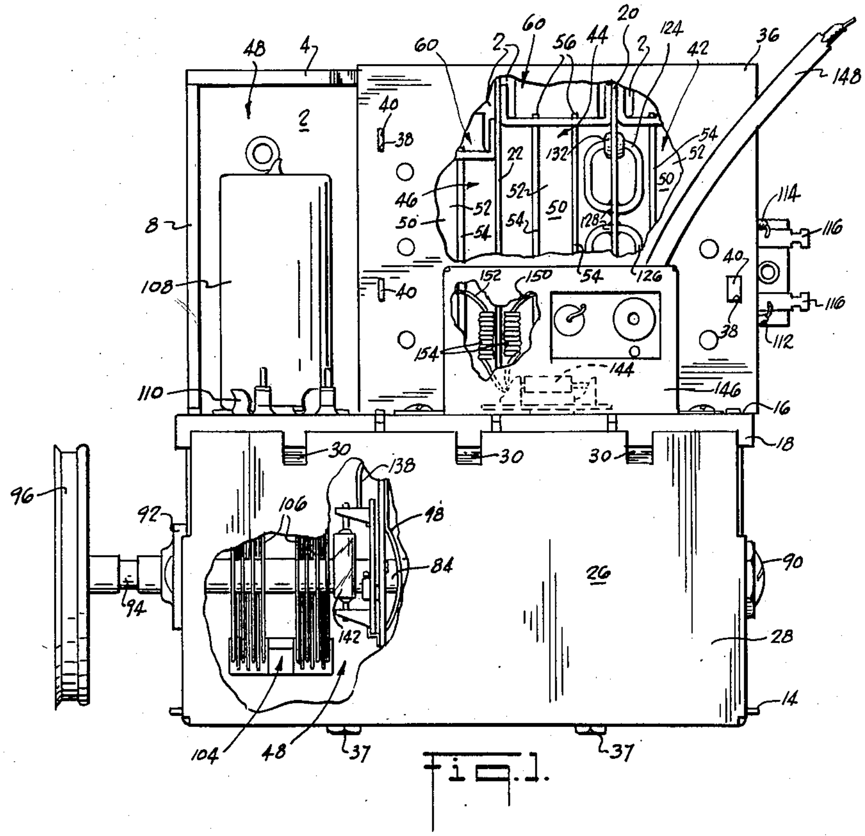
Fig. 1 is a top plan view, partially broken away, of one embodiment of the present invention.
Figure 2:
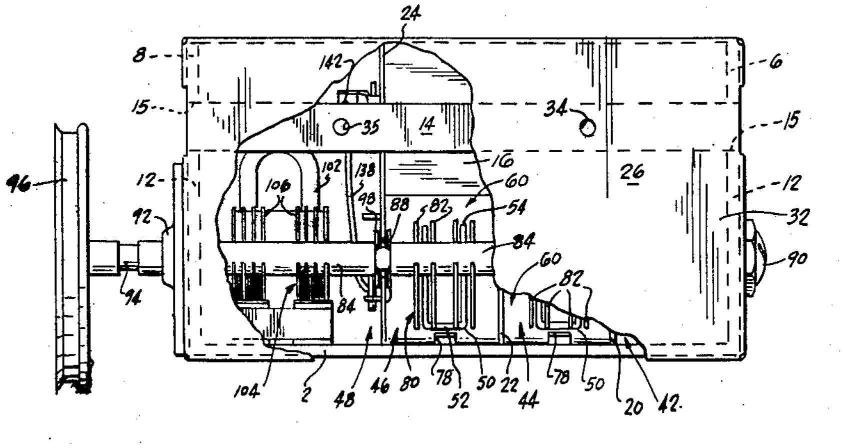
Fig. 2 is a front elevational view of the tuning unit, partially broken away.

The chassis of the tuning unit comprises a base plate 2 defining the bottom wall of the unit, to which rear wall 4 and side walls 6 and 8 are integrally connected. The side walls 6 and 8 have short rear portions 10 and elevated front portions 12. A bar 14 extends across the front of the unit between the side wall portions 12 and interlocked therewith by means of the notches 15 so as to provide structural rigidity and ensure accurate spacing between those walls. A panel 16 having a slotted upper lip 18 is mounted on and preferably interlocks with the rear edges of the side wall portions 12, the lip 18 fitting over the upper surface thereof. This panel is provided for the mounting of external circuit elements, as will be pointed out specifically below.

The unit is provided with a plurality of partitioning walls, here shown as three in number and represented by the reference numerals 20, 22, and 24, said walls having a shape substantially corresponding to that of the side wall 6 and being rigidly secured in place so as to extend along the length of the tuning unit in spaced relationship, preferably being interlocked with the rear wall 4, the bottom wall 2, and the panel 16 by projections 25 and with the bar 14 by notches 27, these interlocks ensuring that the walls 20, 22 and 24 will be accurately and firmly positioned and spaced.

All of the structural walls thus far discussed are of conductive material and are conductively as well as physically connected, the chassis and its subsidiary parts thus constituting what may be considered as ground in an electrical circuit.

For purposes of completing and enclosing the chassis, the front portion of the unit is covered by an L-shaped cover 26 the forward edge of the top wall 28 of which extends over the lip 18 of the panel 16 and is provided with depressed tongues 30 which pass under that lip 18. The rear wall 32 is provided with apertures 34 in line with corresponding apertures 35 in the bar 14 so that screws 37 may pass through those apertures and secure cover 26 in place. The top of the space between the rear portion 10 of the side wall 6 and the partition wall 24 is closed by a plate 36 having apertures 38 through which projections 40 extending upwardly from the walls 6 and 24 are received. The plate 36 may be positively secured in place either by distorting the projections 40 after they have passed through the apertures 38 or by use of solder or the like.

The partitioning walls 20, 22 and 24 in conjunction with the bottom wall 2 and side walls 6 and 8 define a plurality of compartments generally designated 42, 44, 46 and 48. A conductive member 50 is mounted in each of the compartments 42, 44 and 46, each of those members 50 having a length less than that of the compartment in which it is found and being mounted in that compartment so as to be spaced from the walls thereof. As here specifically disclosed, and as may best be seen from Fig. 6, the conductive member 50 is U-shaped in cross section and includes a bottom wall 52 and parallel side walls 54. The rear end of the member 50 has projections 56 extending from the side walls 54, those projections being received within correspondingly shaped recesses 58 in mounting members 60, also formed of conductive material and comprising a front wall 62, side walls 64 and a bottom wall 66. The conductive member 50 is supported by the mounting member 60 in cantilever fashion, the bottom wall 52 of the conductive member 50 being spaced above the bottom wall 66 of the mounting member 60 and the side walls 54 of the conductive member 50 being inwardly spaced relative to the side walls 64 of the mounting member 60. As may best be seen from Fig. 4, the bottom wall 66 of the mounting member 60 is adapted to rest on the bottom wall 2 of the tuning unit while, as may best be seen from Fig. 3, the side walls 64 of the mounting member 60 fit snugly between the side walls of the compartment in question. The mounting member 60 is secured in place within a given compartment in any appropriate manner, as by the use of solder or the like, the conductive member 50 thus being held in that compartment so that its walls 52 and 54 are uniformly spaced from the corresponding compartment walls. It will be noted that the forward end 68 of the conductive member 50 is not conductively connected to the compartment walls. In order to ensure accurate spacing between the side walls 54 of the conductive member 50 at their forward end 68, spacing bars 70 are received within slots 72 formed at the upper edge of the side walls 54.

From the geometry of the structure above described, and from the fact that the structural members are made of conductive material, it is apparent that each compartment 42, 44 and 46 constitutes a coaxial line, the outer conductor being defined by the compartment walls (in the case of compartment 42, for example, by the walls 6, 2 and 20) and the inner conductor being defined by the conductive member 50, said coaxial line being closed at its rear end (by the conductive mounting member 50 which conductively connects the rear end of the conductive member 50 to the walls defining the outer conductor) and open at its front end. This coaxial line will normally have a resonant frequency determined by its dimensions, and in particular by the distance from the front and free end 68 of the conductive member 50 to the point where that conductive member is conductively connected to the outer conductor. Thus, having reference to Fig. 3, it will be noted that the length of the inner conductor 50 in the compartment 46 is less than the lengths of the inner conductors 50 in the compartments 42 and 44 respectively. It follows that the natural resonant frequency of the coaxial line defined by the compartment 46 will be higher than the natural resonant frequencies of the coaxial line defined by the compartments 42 and 44, the latter two compartments defining lines having the same natural resonant frequency.

In order to compensate for unavoidable minor variations in dimensions and alignment, a trimmer unit is provided in each compartment, that unit comprising a strip 74 of conductive material secured by solder or the like to the bottom wall 2 of the compartment adjacent the front end 68 of the conductive member 50, the forward portion of the strip 74 being bent up at 76 and then forwardly at 78. The proximity of the portion 78 of the strip 74 to the conductive member 50 will vary the capacitance between the inner and outer conductors of the coaxial line at its open end and consequently will determine the resonant frequency of the line. The portion 78 of the strip 74 will be manually bent at the time that the assembled unit is being tested, thus ensuring that each unit, when it leaves the factory, will have the proper operating characteristics.

In order to permit the coaxial lines defined by the compartments 42, 44 and 46 to be tuned, conductive elements generally designated 80 are movably mounted in each of the compartments 42, 44 and 46, those elements being electrically connected to the outer conductors of the line (the walls of the compartments) and being movable in such a manner that, although they do not directly engage the forward ends 68 of the conductive members 50, they nevertheless overlap those ends 68 to varying degrees. In the form here specifically disclosed the conductive elements 80 take the form of plates 82 comparable in shape to the plates of standard rotary variable condensers, those plates being mounted in any appropriate manner on conductive shaft 84 which is rotatably mounted between the side walls of a given compartment and between the free end 68 of the conductive member 50 and the front end of the compartment itself. The shaft 84 is provided with narrow portions 86 adapted to pass through slots 88 (see Fig. 7) extending inwardly from the front edges of the partitioning walls 20, 22 and 24, the right hand end of the shaft 34 as viewed in Fig. 3 being mounted against a thrust bearing generally designated 90 in the side wall 6 and the left hand end of the shaft 84 passing through ball bearing 92 in the side wall 8 and extending out therefrom at 94, a conventional disc 96 being secured thereto so as to provide for rotation of the shaft 84. Wipers 98 are connected to the walls 6, 20, 22, 24 and 8 and engage the shaft 84, to which the plates 82 are conductively connected, thus conductively connecting the plates 82 with the outer conductors of the coaxial lines.

Figures 4, 5, 6, 7:
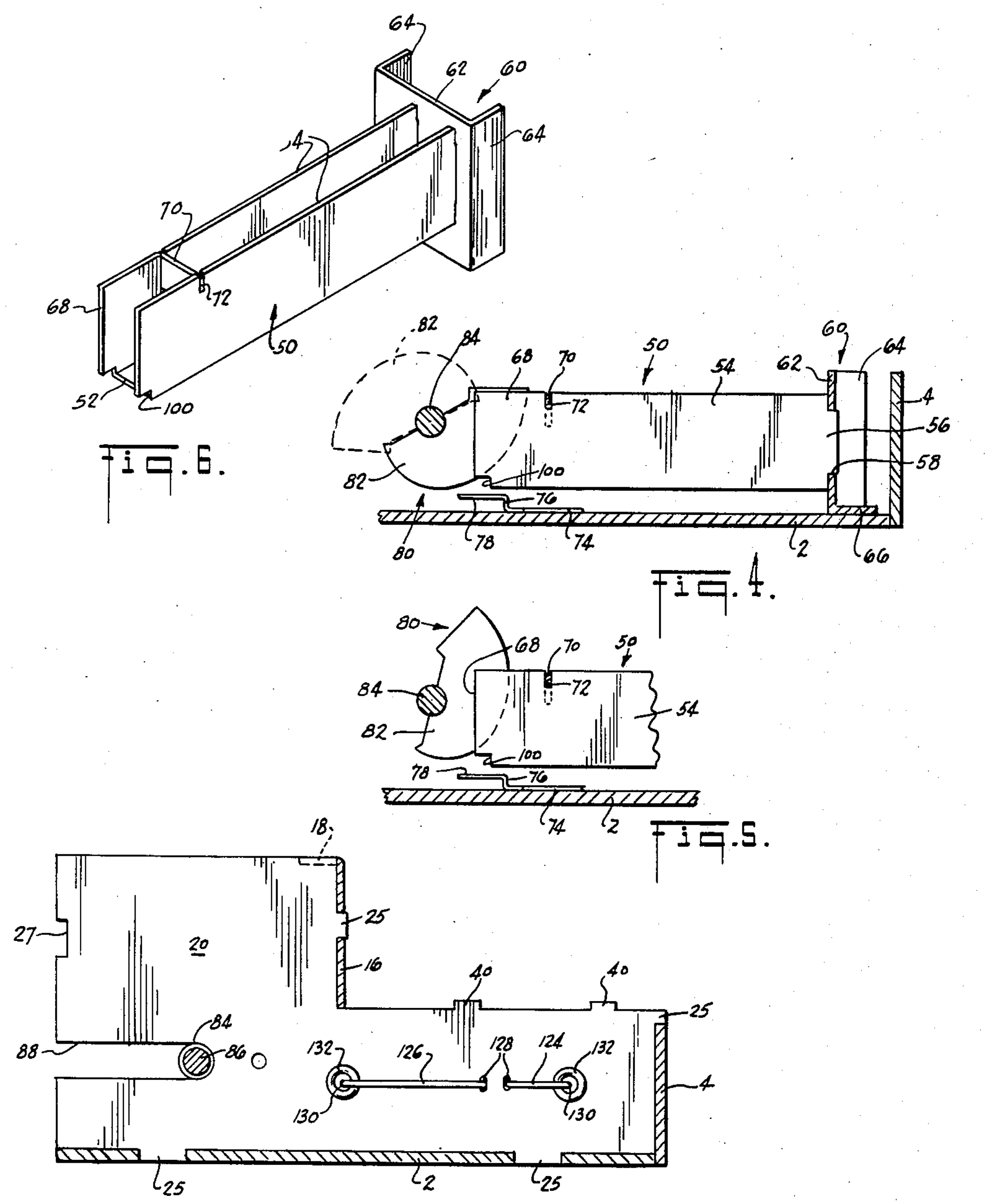
Fig. 4 is a cross sectional view taken along the line 4—4 of Fig. 3, the rotatable plates used for tuning the coaxial line being shown in solid lines in their position of maximum overlap and in broken lines in their position of minimum overlap.
Fig. 5 is a fragmentary view similar to Fig. 4 but showing the tuning plates in a position of intermediate overlap.
Fig. 6 is a detail three-quarter perspective view showing the inner conductor of a coaxial line and the mounting structure therefor.
Fig. 7 is a cross sectional view taken along the line 7—7 of Fig. 3.

As may be seen by an examination of Figs. 4 and 5, rotation of the shaft 84 causes the plates 82 to variably overlap the free ends 68 of the conductive members 50. It is preferred to employ a set of four plates 82 for each compartment, the plates 82 being arranged in two pairs, each pair being adapted to straddle the free end 68 of a different side wall 54 of the conductive member 50, the bottom wall 52 of the conductive member 50 being somewhat cut away, at 100, to provide proper clearance between the plates 82 and the bottom walls 52 when that is desirable.

Various advantages inhere in the use of the rotatable plates 82. In the first place, as those plates increasingly overlap the free end 68 of an inner conductor 50 they not only load the coaxial line by adding capacitance thereto but, at the high frequencies here involved, they also add inductance thereto. Hence a very wide tuning range results enabling a single tuning unit to effectively tune over the entire range from 470 to 890 megacycles per second. Secondly, by appropriately shaping the plate 82 a straight line tuning relationship can be achieved, that is to say, for a given angular motion of the shaft 84 the same tuned frequency change will be achieved over the entire tuning range.

It has previously been pointed out that the basic tuned frequency of the coaxial lines defined by the various compartments is dependent upon the length of the central conductor 50 mounted therein. This permits wide flexibility of use of the tuning unit design here disclosed. The same tuning unit may be used for tuning over different bands or over the same band in a different overall manner, merely by utilizing inner conductors 50 of different lengths from those here specifically shown. Only the central conductors 50 themselves need be different, provided that whatever the length of the central conductor 50 it be mounted in its compartment so that its free end 68 is positioned to be overlapped by the cooperating plates 82.

The compartment 48 as here specifically disclosed does not define a coaxial line but instead is employed to house an oscillator circuit of somewhat more conventional design, that circuit comprising a tank coil defined by a U-shaped conductive strip 102 connected to a substantially conventional rotary variable condenser 104 the rotor plates 106 of which are mounted on that portion of the shaft 84 which passes through the compartment 48. These two elements operate in conjunction with other circuit components and with a tube 108 which may be inserted into socket 110 mounted on the panel 16. The tuning unit, including the oscillator circuit just described, and not necessarily requiring the use of any amplifying tubes, constitutes a self-contained tuning instrumentality adapted to receive a signal for an external antenna circuit and convert it to an intermediate signal which may later be amplified and used in any desired manner.

Figures 3, 8:
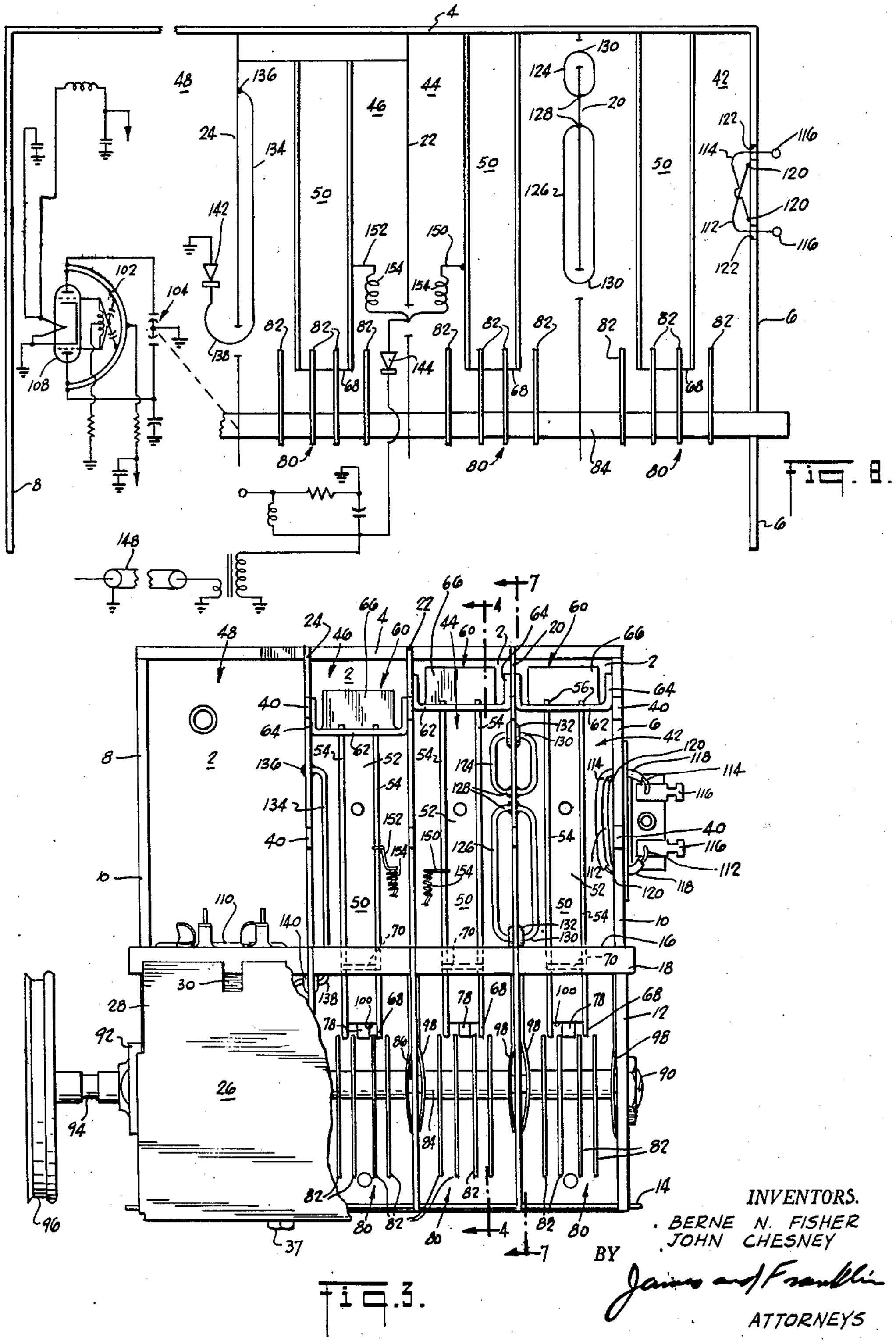
Fig. 3 is a view similar to Fig. 1 but further broken away and with some of the electrical components removed to show the construction and arrangement of the tunable lines.
Fig. 8 is a schematic view showing one circuit arrangement with which the instant tuning device may be employed.

Fig. 8 is a schematic showing of the tuner of the present invention arranged for use as a converter adapted to receive television signals within the band of 470 to 890 megacycles per second and produce therefrom an intermediate frequency signal which can be utilized by existing conventional television receivers so as to reproduce the audible and visual intelligence transmitted by the new television channel. When this installation is to be used with an already existing television receiver, the intermediate frequency output may correspond to that of an already existing but seldom used television channel, such as channel 5 or 6. In such a case, with the existing set tuned to that channel and the intermediate frequency output of the tuning unit of the present invention connected to the input of the already existing conventional television receiver, such a receiver will be able to detect that one of the newly allocated channels to which the unit of the present invention is tuned. If the conventional television receiver is of the continuous tuning type and if no interference with reception of existing channels is permissible or desired, the intermediate frequency output of the tuning unit of the present invention may be at a frequency between two of the already existing television channels, such as between channels 6 and 7. When the conventional television set is tuned to this preselected frequency, the tuning unit of the instant invention will enable it to receive television channels within the newly allocated band. It must be borne in mind, however, that the tuning unit of the present invention may be built into television receivers so as to function in the same manner as the tuning units presently employed, the intermediate output of the tuning unit of the present invention then being at the conventional intermediate frequency of 40 megacycles per second, that output preferably being preamplified and then fed to the regular intermediate frequency section of the television set, to which a separate and conventional tuner capable of receiving the previously allocated channels 2–13 is also connected.

Because of the high frequencies involved, and because of the lack of availability of electron tubes and other circuit components capable of use at frequencies at that order of magnitude, the arrangement of Fig. 8 operates on the frequency-doubling principle, that is to say, the oscillator circuit in compartment 48 generates a frequency one-half of that ultimately desired, the second harmonic of that generated frequency being fed to the tuneable coaxial line defined by compartment 46.

In considering the diagram of Fig. 8 it will further be remembered that the walls of the tuning unit structure are all electrically connected to one another and are maintained at ground potential, so that the ground symbols in Fig. 8 represent points equipotential with the outer conductors of the coaxial lines defined by the compartments 42, 44 and 46.

The input or antenna line, which is a two-wire line, is coupled to the first radio frequency section defined by the coaxial line in the compartment 42 by means of a pair of balanced loops 112 and 114 of conductive wire or the like. One end of each of these loops is connected, at 116, to an appropriate one of the antenna wires. Those ends of the loops 112 and 114 pass through the side wall 6 of the compartment 42 at points spaced from one another and without making electrical connection with the wall 6, this being accomplished by reason of the fact that the wires 112 and 114 are covered by insulation 118 (see Fig. 3). The bodies of the loops 112 and 114 extend along the inner surface of the side wall 6 and between that side wall and the adjacent side wall 54 of the central conductor 50 in the compartment 42. The other ends of the loops 112 and 114 are conductively secured to the side wall 6 at points 120 closely adjacent to the apertures 122 through which the first named ends of the other loops pass. The bodies of the two loops 112 and 114 are therefore closely adjacent one another and are symmertically arranged within the compartment 42. Consequently they define a balanced coupling between the external antenna line and the coaxial line defined by the compartment 42. Moreover, through choice of the size and character of wire of which the loops 112 and 114 are formed and the length of those loops, the degree of loading may also be readily controlled so that optimum line matching may be achieved.

The coaxial line defined by the compartment 42 represents a first radio frequency section tunable through positioning of the plates 82 so as to select a desired signal frequency, that is to say, a frequency corresponding to that one of the newly allocated television channels which is to be detected.

The coaxial line defined by the compartment 44, according to the instant arrangement, constitutes a second radio frequency section a purpose of which is to increase the selectivity of the tuning unit. Accordingly, it is tuned to the same signal frequency as the line of compartment 42. The lines of compartments 42 and 44 are coupled by loops 124 and 126, the ends 128 of those loops being coductively connected to the partition wall 20 which constitutes the common wall between the lines in question and the other ends 130 of those loops passing through insulating grommets 132 which pierce the wall 20, the ends 130 of the loops 124 and 126 thus passing through the wall 20 without being conductively connected thereto. While but a single loop 124 or 126 would provide coupling between the lines of compartments 42 or 44, it is preferred, as illustrated, to utilize two such loops, the loop 124 being shorter than the loop 126 and positioned closer to the connected ends of the central conductors 50 than is the longer loop 126. The use of two loops provides for greater uniformity in coupling over the wide range of frequencies tuned by the unit, the shorter loop 124 having such a length and being so positioned with respect to the length of the inner conductor 50 as to be more efficient in coupling the higher frequencies of the tuned band, the longer lop 126 having such a length and being so positioned with respect to the length of the inner conductor 50 as to be more efficient in coupling the lower frequencies of the tuned band.

The oscillator circuit and the tube 108 mounted in compartment 48 is in the illustrated arrangement adapted to be tuned by means of the rotor plates 106 to a frequency equal to one-half of the sum of the signal frequency to which the lines of compartments 42 and 44 are tuned plus or minus (preferably plus) the desired intermediate output frequency. The later may, as indicated above, equal the frequency of pre-existing channels 6 or 7, some frequency intermediate between pre-existing channels, the conventional intermediate frequency of 40 megacycles per second, or any other value, depending upon the use to which the tuner is to be put.

The coaxial line of compartment 46 is adapted to be tuned to a frequency twice that of the output of the oscillator. Since this frequency is usually higher than the signal frequency to which the lines of compartments 42 and 44 are tuned (since the desired intermediate frequency is usually added to the signal frequency), the line of compartment 46 has a smaller physical length than the other lines, this being clearly evident from the fact that its central conductor 50 is shorter than the lines of compartments 42 and 44. The oscillator of compartment 48 is coupled to the line of compartment 46, which constitutes an oscillator doubler section, by means of loop 134 one end 136 of which is conductively connected to the partition wall 24 which separates the compartments 46 and 48, the body of which extends along the inside of the wall 24 and between that wall and the inner conductor 50 within the compartment 46, and the end 138 of which passes through insulating grommet 140 which pierces the wall 124, the end 138 of the loop 134 thus passing through the wall 124 without being conductively connected thereto. That portion of the loop 134 which extends into the compartment 148 is coupled to the oscillator circuit in any appropriate manner. As here disclosed it leads to a crystal 142 mounted on but insulted from the partition wall 24, the crystal in turn being conductively connected to the output of the oscillator, the crystal serving to build up the second harmonic of the oscillator frequency and to reduce the amplitude of the fundamental frequency of the oscillator.

The output of the oscillator doubler section defined by the line of compartment 46 and the output of the second radio frequency section defined by the line of compartment 44 are next mixed to produce the desired intermediate frequency output, the mixing being carried out at the frequencies involved by means of a crystal 144 mounted, together with other appropriate circuit components, on panel 16 and enclosed within shield housing 146. The output of the mixing circuit is fed by coaxial cable 148 to any appropriate point in an external circuit.

The output of the lines of compartments 44 and 46 should, if optimum and uniform operations over the entire band is desired, be of substantially the same magnitude whether signals at the low or at the high end of that band are being selected. However, the voltage and current distribution along the length of tuned coaxial lines will vary depending upon the frequency to which those lines are tuned. Consequently if a fixed tap is employed the voltage output will not be constant as the line is tuned over a range, and the greater the tuned range, the greater will be the variation in voltage output. A movable tap can eliminate this difficulty, but to provide a movable tap involves additional expense and complexity and furthermore, particularly at the high frequencies involved, involves problems of uniform contact making which cannot readily be solved without exceedingly large and complex installations.

The tuning unit of the present invention avoids the dilemma thus presented, and does so in an inexpensive and highly effective manner. Each of the lines of compartments 44 and 46 are coupled to one another and to the mixing crystal 142 by means of wires 150 and 152 respectively, the inner ends of those wires being fixedly secured to appropriate points on the inner conductors 50 of the lines in question by means of solder or the like. The bodies of those lines are formed into coils 154, and the outer ends of the lines 150 and 152 then extend over the top of the wall 22 to the mixing crystal 144 mounted on the panel 16. The inductances of the coils 154 are so chosen with respect to the points at which the wires 150 and 152 are connected to their respective conductors 50 that the reactances of the coils 154 will vary in a manner corresponding to the voltage variations at the tap points, in the same sense as those voltage variations and to substantially the same amount. Thus, when the frequency to which the lines of compartments 42 and 46 are tuned should increase, the points at which the inner ends of the wires 150 and 152 are secured to their respective inner conductors 50 are so chosen that the tapped voltage at those points will also increase. However, with the increase in frequency will come a consequent increase in the reactance of the coils 154, there will be a greater voltage drop through those coils, the magnitude of that increase in voltage drop will be substantially equal to and will compensate for the increase in voltage at the tap points, and consequently the output voltage from each of the lines of compartments 44 and 46 will remain substantially constant.

It will be appreciated that if electron tubes and other components become available which are capable of effective use at the high frequencies involved, the arrangement of Fig. 8 could be correspondingly modified so that the oscillator will directly produce a frequency equal to the signal frequency plus or minus (usually plus) the desired intermediate output frequency, the line of compartment 46 then operating as an additional preselector stage, tuned to the signal frequency and hence of the same effective length as each of the lines of compartments 42 and 44, the mixer circuit being connected on the one hand directly to the oscillator and on the other hand to the line of compartment 46. The only modification required in the tuning unit for this arrangement would be the use of a central conductor 50 in the compartment 46 which is of the same length as the central conductors 50 of the compartments 42 and 44, and the use of a coupling arrangement between the lines of compartments 44 and 46 similar to that already shown between the lines of compartments 42 and 4. This arrangement would have the advantage that, because an additional preselector stage is employed, the possibility of spurious results would be reduced and the magnitude of significant images would be greatly reduced.

Modifications along the same lines could be made without substantial changes in the construction involved in order to adapt the unit for use as an independent tuner for the newly allocated television channels and having an intermediate frequency output of the conventional 40 megacycles per second. This would merely involve utilizing central conductors for the appropriate coaxial lines such that those lines will be tuned by rotation of the plates 82 over the desired frequency range. In addition, it will be appreciated that if interstage amplification is desired, appropriate amplifying tubes, together with their associated circuit components, could be mounted on the panel 16 or elsewhere and electrically connected to appropriate points on the tuning unit itself without requiring any modification of the basic tuning unit structure.

The use of tuned coaxial lines permits the production of a tuning unit without interstage amplification. If the noise level in such a tuning unit is to be kept sufficiently low so as not to interfere with proper signal detection (and it will be remembered that gain may be introduced at any point in the overall receiving system), it will be necessary to minimize the insertion loss of the tuning elements themselves. This insertion loss is determined by the ratio between the Q of the unit unloaded and the Q of the unit loaded, the greater that ratio the lower the insertion loss. Q may be represented as the fundamental frequency divided by the band width. The band width may be considered as constant. Consequently the loaded Q will vary with the frequency to which the unit is tuned, being higher at the high frequency end of the band. If uniform operating characteristics are to be achieved, a tuning unit must be employed in which the unloaded Q of the unit will also increase with frequency, and to substantially the same extent as the loaded Q. Furthermore, the unloaded Q should be as much greater as the loaded Q as possible in order to reduce the absolute magnitude of the insertion loss. The coaxial lines which constitute the tuning elements of the present invention have these characteristics. Moreover, by silver plating all of the conductive elements (the walls 2, 4, 6, 8, 20, 22 and 24, the inner conductors 50, the mounting structures 60 therefor, and the conductive elements 80, including the plates 82 and the shaft 84), the unloaded Q of the unit has been found to increase approximately two and one-half times, thus correspondingly reducing the insertion loss. By employing plates 82 which overlap the ends of the inner conductors 50 to varying degrees, thus adding both capacitance and inductance to the line, satisfactory and, indeed, exceptional tuning range is produced, a tuned frequency variation of greater than two to one being easily obtainable over the 470 to 890 megacycle band. Moreover, the use of rotor plates 82 permits the ready attainment on a production basis of any desired tuning characteristic, including a straight line characteristic. In addition, alignment and adjustment of the unit may be readily achieved on a production line basis by bending both the projecting end 78 of the trimmer strip 74 and/or portions of the periphery of selected plates 82. The embodiment as here specifically illustrated shows the flexibility of use of the tuning unit of the instant invention insofar as coupling is concerned. Balanced coupling, with any desired degree of loading, is easily achieved, substantially uniform coupling between stages even over a wide frequency range is also readily attainable, and means are provided through which constant voltage output may be achieved even though a fixed tap is employed.

While but a single embodiment of the present invention has been here disclosed, it will be apparent that many variations may be made therein, all within the scope of the instant invention as defined in the following claims.

We claim:

1. A tuning unit comprising a conductive bottom wall, conductive partition walls electrically connected to said bottom wall and dividing said tuning unit into three elongated compartments, conductive members, one for each compartment and each shorter than each said compartment, each conductive member being mounted in its compartment spaced from said walls, conductively electrically connected at one end to said walls, and electrically separated at its other end from said walls, so as to define therewith a coaxial line, and conductive elements movably mounted on said tuning unit, electrically connected to said walls and movable so as to be positioned beyond said other ends of said conductive members but, when moved, to overlap said other end of said members to varying degrees, thereby tuning said coaxial lines over a predetermined range, a first compartment being coupled to an external two-wire circuit by a pair of conductive wires or the like each connected at one end to a wall of said first compartment, extending inside said first compartment between said wall and the conductive member in said compartment and having their other end passing through said wall to different wires of said external circuit without making electrical connection with said wall, said wires extending alongside one another within said first compartment and said one end of each of said wires being connected to said wall adjacent the point where said other end of said other wire passes through said wall, said first compartment being coupled to a second compartment by a plurality of conductive loops, each of said loops extending on the inside of walls of both said compartments and between said walls and the conductive members in the respective compartments, one end of each of said loops being electrically connected to said walls and the other end of each of said loops passing through said walls without making electrical connection therewith, said loops being spaced from one another along the length of said compartment, a third compartment being coupled to another external circuit by a conductive wire or the like connected at one end to a wall of said third compartment, extending inside said third compartment between said wall and the conductive member in said third compartment, and passing through said wall to said other external circuit without making electrical connection with said wall, said second and third compartments being coupled to one another and to a third external circuit by a pair of conductive wires or the like, one end of each wire being electrically connected respectively to a point on the conductive members in said second and third compartments, the bodies of said wires being formed into coils, and the other ends of said wires extending out of their respective compartments and being connected to said third external circuit, the points on said conductive members where said one end of said wires are connected and the inductance of said coils being so chosen and related that as the voltage magnitudes at said points change with the tuned frequencies of said compartments, the reactance of said coils will vary in the same sense and in substantially the same amount.

2. A tuning unit comprising a conductive bottom wall, conductive partition walls electrically connected to said bottom wall and dividing said tuning unit into three elongated compartments, conductive members, one for each compartment and each shorter than each said compartment, each conductive member being mounted in its compartment spaced from said walls, conductively electrically connected at one end to said walls, and electrically separated at its other end from said walls, so as to define therewith a coaxial line, and conductive elements movably mounted on said tuning unit, electrically connected to said walls and movable so as to be positioned beyond said other ends of said conductive members but, when moved, to overlap said other end of said members to varying degrees, thereby tuning said coaxial lines over a predetermined range, an extreme compartment being coupled to an external two-wire circuit by a pair of conductive wires or the like each connected at one end to a wall of said extreme compartment, extending inside said extreme compartment between said wall and the conductive member in said compartment and having their other end passing through said wall to different wires of said external circuit without making electrical connection with said wall, said wires extending alongside one another within said extreme compartment and said one end of each of said wires being connected to said wall adjacent the point where said other end of said other wire passes through said wall, another extreme compartment being coupled to another external circuit by a conductive wire or the like connected at one end to a wall of said other extreme compartment, extending inside said other extreme compartment between said wall and the conductive member in said other extreme compartment and passing through said wall to said other external circuit without making electrical connection with said wall, and one of said compartments being coupled to a third external circuit by a conductive wire or the like, one end of which is electrically connected to a point on the conductive member within said one compartment, the body of which is formed into a coil, and the other end of which extends out of said one compartment to said third external circuit, said point on said conductive member to which said one end of said wire is connected and the inductance of said coil being so chosen and related that as the voltage magnitude at said point changes with the tuned frequency of said compartment, the reactance of said coil will vary in the same sense and in substantially the same amount.

3. A tuning unit comprising a conductive bottom wall, conductive partition walls electrically connected to said bottom wall and dividing said tuning unit into a plurality of elongated compartments, conductive members, one for each compartment and each shorter than each said compartment, each conductive member being mounted in its compartment spaced from said walls, conductively electrically connected at one end to said walls, and electrically separated at its other end from said walls, so as to define therewith a coaxial line, and conductive elements movably mounted on said tuning unit, electrically connected to said walls and movable so as to be positioned beyond said other ends of said conductive members but, when moved, to overlap said other end of said members to varying degrees, thereby tuning said coaxial lines over a predetermined range, one of said compartments being electrically coupled to an external circuit by a conductive wire or the like one end of which is electrically connected to a point on the conductive member in said compartment, the body of which is formed into a coil, and the other end of which extends out of said compartment to said external circuit, said point on said conductive member to which said one end of said wire is connected and the inductance of said coil being so chosen and related that as the voltage magnitude at said point changes with the tuned frequency of said compartment, the reactance of said coil will vary in the same sense and in substantially the same amount.

4. A tuning unit comprising a conductive bottom wall, conductive partition walls electrically connected to said bottom wall and dividing said tuning unit into a plurality of elongated compartments, conductive members, one for each compartment and each shorter than each said compartment, each conductive member being mounted in its compartment spaced from said walls, conductively electrically connected at one end to said walls, and electrically separated at its other end from said walls, so as to define therewith a coaxial line, and conductive elements movably mounted on said tuning unit, electrically connected to said walls and movable so as to be positioned beyond said other ends of said conductive members but, when moved, to overlap said other end of said members to varying degrees, thereby tuning said coaxial lines over a predetermined range, one of said compartments being electrically coupled to an external two-wire circuit by a pair of conductive wires or the like each connected at one end to a wall of said compartment, extending inside said compartment between said wall and the conductive member in said compartment, and having their other ends passing through said wall to said external circuit without making electrical connection with said wall, said wires extending alongside one another within said compartment and said one end of each of said wires being connected to said wall adjacent the point where said other end of said other wire passes through said wall.

5. A tuning unit comprising a conductive bottom wall, conductive partition walls, electrically connected to said bottom wall and dividing said tuning unit into three elongated compartments, conductive channel-shaped members, one for each compartment and each shorter than its compartment, each channel-shaped member being mounted in its compartment substantially coaxially therewith so as to be spaced from said walls, conductively electrically connected at one end to said walls and electrically separated at its other end from said walls, so as to define therewith a coaxial line, and conductive elements movably mounted on said tuning unit in said compartments respectively, electrically connected to said walls and movable so as to be positioned beyond said other ends of said conductive members but, when moved, to overlap said other end of said members to varying degrees, thereby tuning said coaxial lines over a predetermined range, a first compartment being coupled to an external two-wire circuit by a pair of conductive wires or the like each connected at one end to a wall of said first compartment, extending inside said compartment between said wall and the conductive member in said compartment and having their other end passing through said wall to different wires of said external circuit without making electrical connection with said wall, said wires extending alongside one another within said first compartment and said one end of each of said wires being connected to said wall adjacent the point where said other end of said other wire passes through said wall, said first compartment being coupled to a second compartment by a plurality of conductive loops, each of said loops extending on the inside of walls of both said compartments and between said walls and the conductive members in the respective compartments, one end of each of said loops being electrically connected to said walls and the other end of each of said loops passing through said walls without making electrical connection therewith, said loops being spaced from one another along the length of said compartment, a third compartment being coupled to another external circuit by a conductive wire or the like connected at one end to a wall of said third compartment, extending inside said third compartment between said wall and the conductive member in said third compartment, and passing through said wall to said other external circuit without making electrical connection with said wall, said second and third compartments being coupled to one another and to a third external circuit by a pair of conductive wires or the like, one end of each wire being electrically connected respectively to a point on the conductive members in said second and third compartments, the bodies of said wires being formed into coils, and the other ends of said wires extending out of their respective compartments and being connected to said third external circuit, the points on said conductive members where said one end of said wires are connected and the inductance of said coils being so chosen and related that as the voltage magnitudes at said points change with the tuned frequencies of said compartments, the reactance of said coils will vary in the same sense and in substantially the same amount.

6. A tuning unit comprising a conductive bottom wall, conductive partition walls, electrically connected to said bottom wall and dividing said tuning unit into three elongated compartments, conductive channel-shaped members, one for each compartment and each shorter than its compartment, each channel-shaped member being mounted in its compartment substantially coaxially therewith so as to be spaced from said walls, conductively electrically connected at one end to said walls and electrically separated at its other end from said walls, so as to define therewith a coaxial line, and conductive elements movably mounted on said tuning unit in said compartments respectively, electrically connected to said walls and movable so as to be positioned beyond said other ends of said conductive members but, when moved, to overlap said other end of said members to varying degrees, thereby tuning said coaxial lines over a predetermined range, in which said tuning unit comprises three compartments, an extreme compartment being coupled to an external two-wire circuit by a pair of conductive wires or the like each connected at one end to a wall of said extreme compartment, extending inside said extreme compartment between said wall and the conductive member in said compartment and having their other end passing through said wall to different wires of said external circuit without making electrical connection with said wall, said wires extending alongside one another within said extreme compartment and said one end of each of said wires being connected to said wall adjacent the point where said other end of said other wire passes through said wall, another extreme compartment being coupled to another external circuit by a conductive wire or the like connected at one end to a wall of said other extreme compartment, extending inside said other extreme compartment between said wall and the conductive member in said other extreme compartment, and passing through said wall to said other external circuit without making electrical connection with said wall, and one of said compartments being coupled to a third external circuit by a conductive wire or the like, one end of which is electrically connected to a point on the conductive member within said one compartment, the body of which is formed into a coil, and the other end of which extends out of said one compartment to said third external circuit, said point on said conductive member to which said one end of said wire is connected and the inductance of said coil being so chosen and related that as the voltage magnitude at said point changes with the tuned frequency of said compartment, the reactance of said coil will vary in the same sense and in substantially the same amount.

7. In combination with the tuning unit of claim 1, a tunable oscillator unit, the tuning components of which are operatively connected to and moved in synchronism with said conductive elements, said oscillator unit being mounted on said tuning unit adjacent said third compartment and constituting said other external circuit to which said third compartment is coupled.

8. In combination with the tuning unit of claim 2, a tunable oscillator unit the tuning components of which are operatively connected to and moved in synchronism with said conductive elements, said oscillator unit being mounted on said tuning unit adjacent said other extreme compartment and constituting said other external circuit to which said other extreme compartment is coupled.

9. In combination with the tuning unit of claim 5, a tunable oscillator unit, the tuning components of which are operatively connected to and moved in synchromism with said conductive elements, said oscillator unit being mounted on said tuning unit adjacent said third compartment and constituting said other external circuit to which said third compartment is coupled.

10. In combination with the tuning unit of claim 6, a tunable oscillator unit the tuning components of which are operatively connected to and moved in synchronism with said conductive elements, said oscillator unit being mounted on said tuning unit adjacent said other extreme compartment and constituting said other external circuit to which said other extreme compartment is coupled.

11. A tuning unit comprising a conductive bottom wall, conductive partition walls electrically connected to said bottom wall and dividing said tuning unit into a plurality of elongated compartments, conductive channel-shaped members, one for each compartment and each shorter than its compartment, each channel-shaped member being mounted in its compartment substantially coaxially therewith so as to be spaced from said walls, conductively electrically connected at one end to said walls and electrically separated at its other end from said walls, so as to define therewith a coaxial line, and conductive elements movably mounted on said tuning unit in said compartments respectively, electrically connected to said walls and movable so as to be positioned beyond said other ends of said conductive members but, when moved, to overlap said other end of said members to varying degrees, thereby tuning said coaxial lines over a predetermined range, one of said compartments being electrically coupled to an external circuit by a conductive wire or the like one end of which is electrically connected to a point on the conductive member in said compartment, the body of which is formed into a coil, and the other end of which extends out of said compartment to said external circuit, said point on said conductive member to which said one end of said wire is connected and the inductance of said coil being so chosen and related that as the voltage magnitude at said point changes with the tuned frequency of said compartment, the reactance of said coil will vary in the same sense and in substantially the same amount.

12. A tuning unit comprising a conductive bottom wall, conductive partition walls electrically connected to said bottom wall and dividing said tuning unit into a plurality of elongated compartments, conductive channel-shaped members, one for each compartment and each shorter than its compartment, each channel-shaped member being mounted in its compartment substantially coaxially therewith so as to be spaced from said walls, conductively electrically connected at one end to said walls and electrically separated at its other end from said walls, so as to define therewith a coaxial line, and conductive elements movably mounted on said tuning unit in said compartments respectively, electrically connected to said walls and movable so as to be positioned beyond said other ends of said conductive members but, when moved, to overlap said other end of said members to varying degrees, thereby tuning said coaxial lines over a predetermined range, one of said compartments being electrically coupled to an external two-wire circuit by a pair of conductive wires or the like each connected at one end to a wall of said compartment, extending inside said compartment between said wall and the conductive member in said compartment, and having their other ends passing through said wall to said external circuit without making electrical connection with said wall, said wires extending alongside one another within said compartment and said one end of each of said wires being connected to said wall adjacent the point where said other end of said other wire passes through said wall.

13. A tuning unit comprising a conductive bottom wall, conductive partition walls electrically connected to said bottom wall and dividing said tuning unit into a plurality of elongated compartments, conductive members, one for each compartment and each shorter than each said compartment, each conductive member being mounted in its compartment spaced from said walls, conductively electrically connected at one end to said walls, and electrically separated at its other end from said walls, so as to define therewith a coaxial line, and conductive elements movably mounted on said tuning unit, electrically connected to said walls and movable so as to be positioned beyond said other ends of said conductive members but, when moved, to overlap said other end of said members to varying degrees, thereby tuning said coaxial lines over a predetermined range, a pair of adjacent compartments being electrically coupled by a plurality of conductive loops each extending on both sides of the wall between said compartments and between said wall and the conductive members in the respective compartments, the ends of said loop being electrically connected to said wall and a part of said loop remote from their ends passing through said wall without making electrical connection therewith, said loops being spaced from one another along the length of said compartments, one of said loops being longer than the other and the shorter of said loops being closer to said one end of said conductive elements.

14. A tuning unit comprising a conductive bottom wall, conductive partition walls electrically connected to said bottom wall and dividing said tuning unit into a plurality of elongated compartments, conductive channel-shaped members, one for each compartment and each shorter than its compartment, each channel-shaped member being mounted in its compartment substantially coaxially therewith so as to be spaced from said walls, conductively electrically connected at one end to said walls and electrically separated at its other end from said walls, so as to define therewith a coaxial line, and conductive elements movably mounted on said tuning unit in said compartments respectively, electrically connected to said walls and movable so as to be positioned beyond said other ends of said conductive members but, when moved, to overlap said other end of said members to varying degrees, thereby tuning said coaxial lines over a predetermined range, a pair of adjacent compartments being electrically coupled by a plurality of conductive loops each extending on both sides of the wall between said compartments and between said wall and the conductive members in the respective compartments, the ends of said loops being electrically connected to said wall and a part of said loops remote from their ends passing through said wall without making electrical connection therewith, said loops being spaced from one another along the length of said compartments, one of said loops being longer than the other and the shorter of said loops being closer to said one end of said conductive elements.

References Cited in the file of this patent

UNITED STATES PATENTS

| | | |
|---|---|---|
| Re. 23,277 | Hansen | Oct. 3, 1950 |
| 1,988,444 | Carpenter | Jan. 22, 1935 |
| 2,132,208 | Dunmore | Oct. 4, 1938 |
| 2,272,062 | George | Feb. 3, 1942 |
| 2,272,066 | Peterson | Feb. 3, 1942 |
| 2,311,522 | Conron | Feb. 16, 1943 |
| 2,366,750 | Pray | Jan. 9, 1945 |
| 2,488,545 | Lader | Nov. 22, 1949 |
| 2,596,117 | Bell | May 13, 1952 |
| 2,656,517 | Johnson | Oct. 20, 1953 |